United States Patent [19]
Blaszyk et al.

[11] 4,298,364
[45] Nov. 3, 1981

[54] METHOD OF MAKING OPTICAL FIBERS HAVING IMPROVED CORE ROUNDNESS

[75] Inventors: Paul E. Blaszyk, Big Flats; Susan F. Murphy, Corning, both of N.Y.

[73] Assignee: Corning Glass Works, Corning, N.Y.

[21] Appl. No.: 131,169

[22] Filed: Mar. 17, 1980

[51] Int. Cl.³ .................. C03B 23/07; C03B 37/025; C03B 37/07; C03B 37/075

[52] U.S. Cl. ..................... 65/3.11; 65/110; 427/163

[58] Field of Search .............. 65/2, 3 A, 13, 3.11, 65/3.12, 110, 292; 427/163, 237; 264/1.5, 2.7

[56] References Cited
U.S. PATENT DOCUMENTS

| | | | |
|---|---|---|---|
| 3,907,536 | 9/1975 | Achener | 65/3 A X |
| 4,154,591 | 5/1979 | French et al. | 65/3 A X |
| 4,199,335 | 4/1980 | Gliemeroth | 65/2 |

FOREIGN PATENT DOCUMENTS

| | | |
|---|---|---|
| 1501586 | 2/1978 | United Kingdom . |
| 1555562 | 11/1979 | United Kingdom . |

OTHER PUBLICATIONS

Okada et al., "Improved Chemical Vapour Deposition . . ."; Electronics Letters; Feb. 16, 1978; pp. 89 and 90.

Primary Examiner—Richard V. Fisher
Attorney, Agent, or Firm—William J. Simmons, Jr.

[57] ABSTRACT

A method of producing optical fibers having improved core roundness and core-clad axis concentricity. Prior to the step of forming a layer of core material on the inner surface of a bait tube, the tube is pressurized and heated and shrunk at least 1 mm and thereafter the pressure is increased to inflate the tube until the outside diameter thereof approximates that of the originally provided bait tube.

6 Claims, 2 Drawing Figures

METHOD OF MAKING OPTICAL FIBERS HAVING IMPROVED CORE ROUNDNESS

BACKGROUND OF THE INVENTION

The present invention relates to a method of forming optical waveguide fibers having improved core roundness and core-clad axis concentricity and more particularly, to a method of treating the preform bait tubes prior to forming deposits on the inner surfaces thereof.

Optical waveguides, which are the most promising medium for use in optical communication systems operating in the visible or near visible spectrum, normally consist of an optical filament having a transparent core surrounded by a transparent cladding material having a refractive index lower than that of the core material.

The stringent optical requirements placed on the transmission medium to be employed in optical communication systems has negated the use of conventional glass fiber optics, since attenuation therein due to both scattering and impurity absorption is much too high. Thus, unique methods had to be developed for preparing very high purity glasses in filamentary form. Certain glass-making processes, particularly vapor deposition processes have been commonly employed in the formation of optical waveguide blanks. In one such process, one or more layers of glass are formed on the inner surface of a glass bait tube by chemical vapor deposition or by other known techniques. Ordinarily, the coated bait tube has at least two compositional regions. The interior region will ultimately form the core of the resultant optical fiber, and the exterior region will form the cladding thereof. The remaining critical step involves drawing the relatively large diameter cylindrical preform into a relatively small diameter fiber. Prior to drawing the preform into a fiber, the preform is usually collapsed into a smaller diameter preform or preferably into a solid cylindrical mass.

Nonuniformities in the bait tube can adversely affect the resultant optical waveguide fiber. For example, a non-circular bait tube will generally result in a fiber which has a non-circular core, even though the outer surface of the fiber is circular in cross-section. Furthermore, it appears that softer core materials are more susceptible of being forced by the collapsing bait tube into cores which are out-of-round. Nonuniform bait tube wall thickness at a given cross-section thereof can result in an optical waveguide fiber in which the axis of the core and that of the cladding are not concentric. Also, a bait tube, the outer surface of which is very round, can become out of round during the step of depositing the core material therein, and/or the deposited core material can be of nonuniform thickness if the bait tube has poor wall thickness uniformity.

Fibers having out-of-round cores and fibers wherein the core is not concentric with the outer cladding surface incur inordinately high splice losses when coupled together. These detrimental features of optical waveguides cores must be minimized if such fibers are to be successfully utilized in long distance waveguide transmission systems.

Some of the terms used in the following description to denote conditions of the bait tube or fiber are defined as follows. The degree of bait tube non-circularity, herein referred to as "percent out of round" (%OOR), is defined as $[(\text{max OD}/\text{min OD}) - 1] \times 100$, wherein OD is the tube outer diameter. Core out-of-round, referred to herein as COOR, is defined as min d/max d, where d is the fiber core diameter. The term "% siding" which is used herein to describe non-uniformity of bait tube wall thickness, is defined as $[(\text{max t}/\text{min t}) - 1] \times 100$, where t is the wall thickness. Preferred bait tubes possess low values of %OOR and % siding, and preferred optical waveguide fibers have a value of COOR as near as possible to 1.0. For each of the bait tube and fiber parameters defined herein, measurements are made at a given cross-section of the tube or waveguide.

One standard for fiber COOR was determined by correlating the effect of out-of-round cores on splicing loss. The results are shown in Table 1.

TABLE 1

| Type Fiber | COOR Range | Splicing Loss (dB) |
|---|---|---|
| Class 1 | 0.98–1.00 | 0.23 |
| Class 2 | 0.95–0.97 | 0.24 |
| Class 3 | 0.90–0.94 | 0.43 |

According to this study, there was no significant difference between splice loss of class 1 and class 2 fibers; however, there was a significant difference between class 2 and class 3 fibers. Based on this study, it is desirable to employ in the process of manufacturing optical waveguide fibers, only bait tubes which are capable of providing fibers having COOR values of about 0.95 or greater.

A commonly employed, commercially available bait tube, hereinafter referred to as a "standard borosilicate tube" is drawn on a "Vello" machine described in *Glass: The Miracle Worker* by C. J. Phillips, (1941) Pitman Publishing Company, pp. 209-212. The tube, which comprises about 96 wt.% $SiO_2$ and about 4 wt.% $B_2O_3$, is formed of glass manufactued in accordance with the teachings of U.S. Pat. Nos. 2,106,744 and 2,221,709. A study of a random sampling of such standard borosilicate tubes revealed that they possessed a mean % OOR of about 1.2% and a mean % siding of about 10%. If such tubes were to be employed without modification in the manufacture of optical waveguide fibers by depositing by chemical vapor deposition a layer of core material on the inner surface thereof, the mean COOR of the resultant fibers would be lower than the minimum acceptable level of COOR that has been established for long distance telecommunications purposes. Indeed, a random sampling of fibers drawn from such standard borosilicate tubes revealed that the average COOR value was less than 0.90.

In order to improve the COOR values of fibers produced from standard borosilicate tubes, such tubes have been shrunk on a precision mandrel, or they have been shrunk on a mandrel and ground to improve the percent siding thereof. Such additional treatment of the standard borosilicate bait tube increases the cost thereof up to about 20 times the cost of the tube as drawn. Also, the mandrel can contaminate the inner surface of the bait tube. It would be advantageous to employ the standard borosilicate bait tube because of the low cost thereof and yet to increase the yield of fibers having acceptable levels of COOR.

U.S. Pat. No. 4,154,591 issued to W. G. French et al. teaches a method whereby expansion of the hollow bait tube prior to the deposition step improves the circularity of an otherwise distorted bait tube. The diameter of the bait tube is increased during the first traversal of the heat source by applying additional positive pressure within that tube, and subsequently the process of forming glass layers on the inner surface of the tube proceeds as heretofore described. Although tube circularity is improved, the % siding is adversely affected by this method. If the % siding of the as-drawn bait tube is extremely low, the expanded bait tube may be satisfactory for use in the vapor deposition process which forms the waveguide core layer. However, when the aforementioned standard borosilicate tubes are expanded in accordance with the teachings of the French et al. patent, the % siding increases, i.e., the wall thickness nonuniformity becomes worse. For example, when five randomly selected standard borosilicate tubes having an OD of about 25 mm, and a wall thickness of about 2.3 mm and having an average % siding of 6.28 were inflated to an OD of about 32 mm, the % siding increased by about 5% to an after inflation value of about 11%. When tube roundness is improved by expanding the tube OD to a value greater than the original tube OD, the % siding will increase, i.e., the tube wall thickness uniformity will be deleteriously affected. During subsequent processing, a tube having a high % siding will more readily become out-of-round. Also, it is thought that nonuniform wall thickness can cause the thickness of the deposited core material to be nonuniform.

The aforementioned French et al. patent also describes a method of collapsing a coated preform pressure to obtain a solid preform having a more symmetrical and circular cross-section. Although such a pressure-collapse technique is advantageous in that it prevents further distortion of a preform during the preform collapse step, it cannot ensure the formation of a fiber having a round core if the bait tube is initially out of round or if it becomes out of round during deposition of the core material therein.

SUMMARY OF THE INVENTION

This invention is an improved technique for forming optical fibers, the cores of which have improved circularity as well as improved concentricity with respect to the outer fiber surface. This invention is a modification of the conventional technique whereby at least one layer of glass is formed on the inner surface of a cylindrical glass bait tube. In accordance with the present invention, various properties of the bait tube are improved by an initial treatment which occurs prior to the deposition of glass on the inner surface thereof. More specifically, the bait tube is heated while a positive pressure is applied to the interior thereof and is shrunk to improve the uniformity of the tube wall thickness. Thereafter, while continuing to apply heat thereto, the pressure within the bait tube is increased so that the tube diameter is increased. The combined shrinking and expansion of the bait tube prior to depositing a glass layer therein results in a tube having improved circularity without exacerbating wall thickness nonuniformity.

To form an optical waveguide fiber from the resultant preform, the preform is preferably collapsed into a solid rod and thereafter drawn into a fiber. The collapsing step is preferably performed while maintaining the inner portion of the preform at a pressure greater than that of the ambient surroundings as taught by the aforementioned patent to W. G. French, et al.

DESCRIPTION OF THE PREFERRED EMBODIMENT

Figure 1:
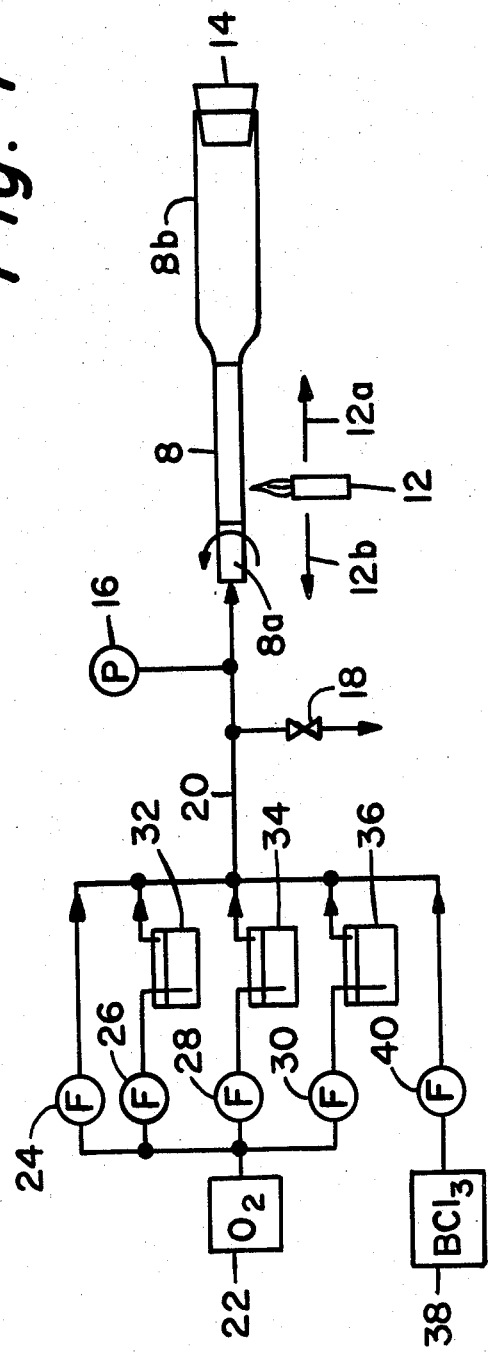
FIG. 1 is a schematic representation of an apparatus by means of which the present invention may be practiced.

FIG. 1 is a schematic representation of an otherwise standard vapor deposition apparatus modified so as to be applicable to the practice of this invention. This system comprises substrate or bait tube 8 having handle tube 8a affixed to the upstream end thereof and exhaust tube 8b affixed to the downstream end thereof. Tubes 8a and 8b are chucked in a conventional glass turning lathe (not shown), and the combination is rotated as indicated by the arrow. The handle tube, which may be omitted, is an inexpensive glass tube having the same diameter as the substrate tube, and it does not form a part of the resultant optical waveguide.

Figure 2:
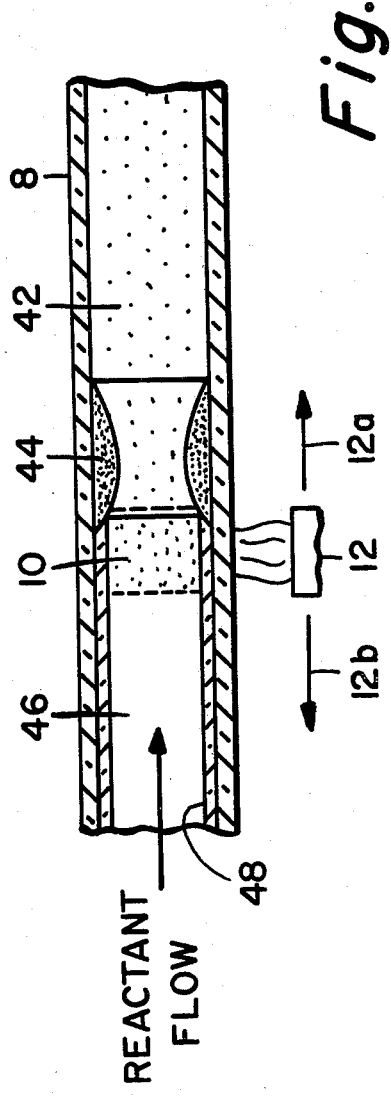
FIG. 2 is a section of the tube of FIG. 1 depicting observed conditions during the deposition of a glass layer therein.

As shown in FIG. 2, a hot zone 10 is caused to traverse tube 8 by moving heating means 12 as schematically depicted by arrows 12a and 12b. Heating means 12 can consist of any suitable source of heat such as a plurality of burners encircling tube 8. However, since the particular heat source is not critical to the practice of this invention, any appropriate source may be utilized, e.g., an electric resistive heat source, an oven, or the like.

To improve the roundness of tube 8 prior to the deposition of glass on the inner surface thereof, the tube is first shrunk under pressure and thereafter bulged or expanded to increase the diameter thereof to a value that is preferably close to the original tube diameter. A shrinking of at least 1 mm. OD and an expansion of at least 1 mm OD is required to obtain a discernible improvement in tube roundness. A single pass of the burner 12 is sufficient to accomplish each of the shrinking and expansion steps. Multiple burner passes could be employed to accomplish each of these steps, but this would only unnecessarily lengthen the process time. Generally, a 2-4 mm. shrinking and expansion of the tube outer diameter have given good results, each of these diameter changes having been readily achieved in single burner passes. The final tube OD may be smaller than, equal to, or larger than the original OD. If the % siding of the original tube is large, then it may be desirable to shrink the tube slightly more than it is expanded so that the % siding of the resulting shrunk and expanded tube is improved.

Variations of the above-described method were attempted without success. The tube was shrunk without applying a positive pressure to the interior thereof. In another experiment, the tube was shrunk but was not thereafter expanded. Also, the tube was expanded first and thereafter shrunk to its initial size. In none of these other processes was the resultant tube improved to the extent to which it is improved when treated in accordance with said above-described method.

It should be readily apparent to those skilled in the art that various process parameters such as temperature, pressure, burner traverse rate and tube composition are interrelated, and therefore, the effect of varying one of these parameters can be offset by varying one or more of the others. It has been found that for the steps of shrinking and expanding a high silica content bait tube, temperatures within the range of 2025-2250 C. when combined with pressures of 0.02-5.0 mm of Hg and burner traverse speeds of 2-20 cm/min have resulted in the desired tube improvement. The term "pressure" is used herein to mean the pressure within the bait tube with respect to that of the region surrounding the tube. These values exemplify typical operating conditions; however, the governing principle of this invention simply requires that the tube be subjected to a sufficiently high temperature to permit the diameter to change and to adequate internal pressures to cause the diameter to initially decrease in a controlled manner and thereafter to increase to the desired outer diameter. Thus, the process parameters can be outside the aforementioned ranges and yet be within the scope of the present invention provided that the bait tube is sufficiently shrunk and expanded so that the desired tube roundness is achieved without detrimentally affecting the % siding thereof.

The pressure within tube 8 can be increased by restricting or preventing the flow of gas from the output end of collector tube 8b by such means as inserting rubber stopper 14 into the end of tube 8b. A gas such as oxygen, nitrogen, or the like, which does not degrade the light transmission characteristics of the material of tube 8, is introduced into that tube. For example, oxygen from source 22 may be caused to flow into tube 8 by way of flow meter 24, inlet tube 20 and handle 8a. The positive pressure within tube 8, which is measured by gauge 16, is controlled by varying the amount of oxygen flowing through flowmeter 24 and by varying the amount of oxygen escaping from bleed valve 18. The described system is exemplary of numerous systems which could be employed to control the pressure within tube 8. For example, an apparatus for automatically obtaining a predetermined tube OD is taught in the publication M. Okada et al., Electronics Letters, Vol. 14, No. 4 (1978) pp. 89-90.

Before and after the shrink and enlarge steps, the burner may be caused to traverse and fire polish the bait tube. After the final fire polish step, stopper 14 is removed and the preform maufacturing process is carried out in accordance with well known techniques. More particularly, reactants are introduced into tube 8 via inlet tube 20, which is connected to a plurality of sources of gases and vapors. In FIG. 1, flow meters are represented by a circle having the letter "F" therein. A source 22 of oxygen is connected by flow meter 24 to inlet tube 20 and by flow meters 26, 28 and 30 to reservoirs 32, 34 and 36, respectively. A source 38 of boron trichloride is connected to tube 20 by a flow meter 40. Reservoirs 32, 34 and 36 contain normally liquid reactant materials which are introduced into tube 8 by bubbling oxygen or other suitable carrier gas therethrough. Exiting material is exhausted through exhaust tube 8b to a vent (not shown). Also not shown is an arrangement of mixing valves and shutoff valves which may be utilized to meter flows and to make other necessary adjustments in composition.

After the % OOR of the tube has been enhanced in accordance with the method of this invention, the tube is processed in accordance with known techniques to form an optical waveguide fiber. Burner 12 initially moves at a low rate of speed relative to tube 8 in the direction of arrow 12a, the same direction as the reactant flow. The reactants flow through region 46 of tube 8 and into hot zone 10 where they react to produce soot, i.e., a powdery suspension of particulate oxidic material, which is carried downstream to region 42 of tube 8 by moving gas. As burner 12 continues to move in the direction of arrow 12a, hot zone 10 moves downstream so that a part of soot buildup 44 extends into the hot zone and is consolidated thereby to form a unitary, homogeneous glassy layer 48. Such process parameters as temperatures, flow rates, reactants and the like can be found in the publications J. B. MacChesney et al., Proceedings of the IEEE, 1280 (1974) and W. G. French et al., Applied Optics, 15 (1976). Reference is also made to the text *Vapor Deposition* edited by C. F. Powell et al. John Wiley and Sons, Inc. (1966).

When burner 12 reaches the end of tube 8 adjacent to exhaust tube 8b, the temperature of the flame is reduced and the burner returns in the direction of arrow 12b to the input end of tube 8. Thereafter, additional layers of glassy material are deposited within tube 8 in the manner described above.

After suitable layers have been deposited to serve as the core material and any other desired layers of the resultant optical waveguide, the temperature of the glass is increased to cause tube 8 to collapse. This can be accomplished by reducing the rate of traverse of the hot zone. Preferably, the interior of tube 8 is pressurized during collapse as taught in said French et al. patent.

The resultant draw blank is then drawn in accordance with well-known techniques to form an optical waveguide filament having the desired diameter.

This invention is further demonstrated by the following examples:

EXAMPLE 1

A plurality of bait tubes were employed, the composition of which was about 96.5 weight percent $SiO_2$ and 3.5 weight percent $B_2O_3$. The outside diameter of the tubes was about 30 mm. and the wall thickness was about 2.0 mm. The average % siding of the tubes was 10%, and the average % OOR was 1.2%. A reactant flow system of the type illustrated in FIG. 1 was employed, and a rubber stopper was placed in the end of tube 8b. Reservoirs 32, 34 and 36 contained $SiCl_4$, $GeCl_4$ and $POCl_3$, respectively.

The bait tube was initially processed to improve the roundness and maintain the % siding thereof. The process parameters are set forth in Table 2.

TABLE 2

| Pass | Excess $O_2$ (l/min) | Traverse Speed (cm/sec) | Temp. (deg. C.) | Spindle Speed (rpm) |
|------|------|------|------|------|
| 1 | 3.0 | 0.310 | 1800 | 65 |
| 2 | 0.8 | 0.155 | 2250 | 55 |
| 3 | 6.2 | 0.250 | 2150 | 55 |
| 4 | 3.0 | 0.310 | 1800 | 65 |

The first and last burner passes were for the purpose of fire polishing the bait tube. The temperature specified in Table 2 is that of the bait tube as measured by a radiation pyrometer. The oxygen is that flowing through flowmeter 24. "Spindle speed" refers to the rotational speed of tube 8. By changing the oxygen flow during the second pass to 0.8 l/min and during the third burner pass to 6.2 l/min, the pressure within tube 8 was caused to be 0.07 and 3.6 mm of Hg, respectively. During the second burner pass, the outside diameter of the tubes was shrunk to about 26 mm, and during the third burner pass it was increased to about 30 mm.

After the roundness of the tubes was enhanced by the above-described process, the stopper was removed from the exhaust tube and the optical waveguide preform manufacturing process was carried out in accordance with well known techniques.

A barrier layer was then deposited on the inner surface of the bait tube during the next ten passes of the burner. The excess oxygen flowing through meter 24 was 3.4 l/min., the flow rates of the $SiCl_4$, $GeCl_4$ and $POCl_3$ were 1.7 gm/min, 0.06 gm/min, and 0.01 gm/min, and the flow rate of $BCl_3$ through meter 40 was 30 cc/min. The burner traverse speed was 0.31 cm/sec, the spindle speed was about 65 rpm, and the bait tube temperature was 1850° C.

Thereafter, the fiber core was deposited during the next 80 passes of the burner. The excess oxygen flow through meter 24 was maintained at 3.4 l/min and the flow rate of $SiCl_4$ was maintained at 1.7 gm/min throughout the entire core deposition process. The flow rate of $GeCl_4$ was increased from 0.06 to 0.45 gm/min and the flow rate of $POCl_3$ was increased from 0.01 to 0.28 between the first and the 80th burner pass. The flow rate of $BCl_3$ was decreased from 30 cc/min during the first pass to 0.892 cc/min during the 37th burner pass. Thereafter, the flow of $BCl_3$ was completely terminated. The burner traverse speed was 0.31 cm/sec and the spindle speed was 65 rpm from 30 cc/min during the first pass to 0.892 cc/min during the 37th burner pass. Thereafter, the flow of $BCl_3$ was completely terminated. The burner traverse speed was 0.31 cm/sec and the spindle speed was 65 rpm during the entire core deposition process. The temperature of the bait tube varied between 1950° C. and 1750° C. from the first burner pass to the 80th burner pass.

After the core layer was deposited within the bait tube, the tube was collapsed during the next seven passes of the burner. The flow rate of oxygen during the collapse portion of the process was 3.1 l/min during the first three burner passes and 3.2 l/min during the remaining four burner passes. The flow rates of $SiCl_4$, $GeCl_4$ and $POCl_3$ were 0.09 gm/min, 0.08 gm/min ad 0.04 gm/min for all seven burner passes. The burner traverse speed was 0.03 cm/sec for all burner passes except the third, for which the traverse speed was 0.02 cm/sec. The spindle speed for all seven passes was 55 rpm. The bait tube temperature was 1930° C. for the first two passes and 2000° C. for the remaining five passes of the collapse cycle.

The resultant solid blank was heated to a temperature of 1850° C. and was drawn to decrease the diameter thereof to about 125 μm. The COOR value of 75% of the resultant fibers was greater than 0.95.

EXAMPLE 2

An optical waveguide fiber was made in accordance with Example 1 except that the second and third burner passes of the bait tube preparation process were as follows. During the second burner pass, the traverse speed was 3.4 cm/min and the spindle speed was 55 rpm. The pressure within tube 8 and 0.37 mm of Hg and the bait tube temperature was 2185° C. During the third burner pass, the traverse speed was increased to 6.4 cm/min and the pressure was increased to 1.58 mm of Hg, the spindle rotation remaining the same. The bait tube temperature was decreased to 2115° C.

The method of Example 2 produced bait tubes having slightly improved roundness as compared with that of Example 1; however, the method of Example 2 required a longer time to condition the bait tube. The COOR value of 89% of the fibers formed in accordance with Example 2 was greater than 0.95.

Since the bait tube conditioning steps of Examples 1 and 2 are part of a continuous process of making an optical waveguide blank or preform, the bait tubes were not examined to determine the change in percent siding thereof, if any, due to the shrink and expansion steps. However, the improvement in bait tube characteristics resulting from the tube conditioning steps of the present invention is obvious from the improvement in COOR values of the resultant fibers. To summarize, 75% of the fibers produced in accordance with Example 1 had COOR values greater than 0.95, and 89% of the fibers produced in accordance with Example 2 had COOR values greater than 0.95. If the bait tubes employed in these examples were not given a preconditioning step whereby they were first shrunk and then expanded, the average COOR values of the resultant fibers would have been less than 0.90.

We claim:

1. In the method of manufacturing an optical waveguide preform which includes the steps of
   providing a cylindrical glass bait tube, and
   forming at least one layer of glass on the inner surface thereof, the improvement which comprises subjecting said bait tube to the following steps prior to the time said layer is formed:
   heating said bait tube,
   providing a positive pressure within said bait tube, decreasing the diameter of said bait tube by at least one mm to form a shrunken tube, and
   increasing the pressure within said shrunken bait tube so that the tube diameter increases to at least one mm greater than the diameter of said bait tube in its shrunken state to form an expanded bait tube, thereby improving the roundness of said bait tube without detrimentally affecting the uniformity of the tube wall thickness.

2. A method in accordance with claim 1 wherein the diameter of said inflated bait tube is about equal to that of said originally provided cylindrical glass bait tube.

3. A method in accordance with claim 1 wherein the diameter of said inflated tube is less than that of the originally provided cylindrical glass bait tube.

4. A method in accordance with claim 1 wherein the diameter of said shrunken tube is between 2 and 4 mm less than that of the originally provided cylindrical glass bait tube and wherein the diameter of said inflated bait tube is between 2 and 4 mm greater than that of the diameter of said shrunken bait tube.

5. A method in accordance with claim 4 wherein, after the step of increasing the pressure within said bait tube to form an inflated bait tube, the following steps are performed:
   forming at least one layer of core material on the inner surface of said inflated bait tube,
   reducing the diameter of said preform, and
   drawing said preform into a fiber.

6. A method in accordance with claim 4 wherein, during the step of decreasing the diameter of said bait tube, the pressure within said tube is from 0.02 to 5.0 mm Hg greater than that of the region surrounding said tube.

* * * * *

UNITED STATES PATENT AND TRADEMARK OFFICE
CERTIFICATE OF CORRECTION

PATENT NO. : 4,298,364

DATED : November 3, 1981

INVENTOR(S) : Paul E. Blaszyk and Susan F. Murphy

It is certified that error appears in the above—identified patent and that said Letters Patent is hereby corrected as shown below:

Column 2, line 35, "manufactued" should be -- manufactured --.

Column 3, line 28, after "preform" should be -- under --.

Column 5, line 29, after "handle" should be -- tube --.

Column 5, line 43, "maufacturing" should be -- manufacturing --.

Column 7, line 41, "ad" should be -- and --.

Column 7, line 60, "and" should be -- was --.

Column 8, lines 27, 28 and 29 should be subparagraphed.

Signed and Sealed this

Second Day of March 1982

[SEAL]

Attest:

GERALD J. MOSSINGHOFF

Attesting Officer

Commissioner of Patents and Trademarks